Sept. 13, 1932.  S. A. KORNSWEET  1,876,692
FISHING APPARATUS
Filed Jan. 3, 1930
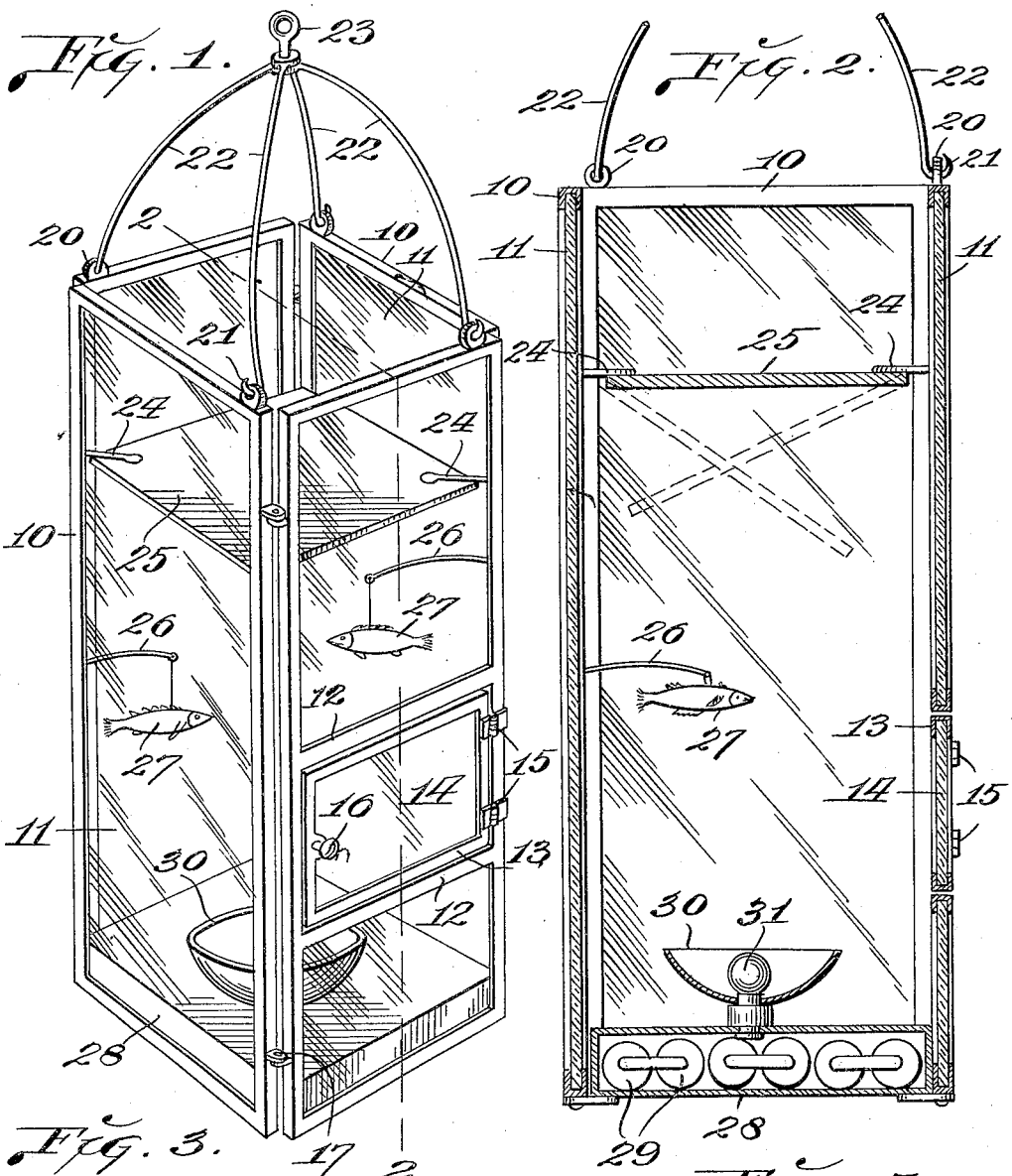
INVENTOR:
SAMUEL A. KORNSWEET.
By Martin C. Smith ATTY.

Patented Sept. 13, 1932

1,876,692

UNITED STATES PATENT OFFICE

SAMUEL A. KORNSWEET, OF VENICE, CALIFORNIA

FISHING APPARATUS

Application filed January 3, 1930. Serial No. 418,193.

My invention relates to a fishing apparatus and the principal object of my invention is, to provide a comparatively simple, inexpensive and efficient appliance that may be utilized for trapping fish and which appliance or trap is devoid of hooks, prongs or like devices that might mutilate the fish and cause the loss of blood therefrom.

Further objects of my invention are, to provide a fishing apparatus having transparent walls, one of which includes a door which may be readily opened in order that the fish may be removed from the trap without injury and further, to provide a trap wherein the interior thereof is illuminated by means of a small electric lamp and reflector located in the lower portion of the trap and which lamp receives its current from storage batteries located in a water proof container that is arranged at the bottom of the trap.

With the foregoing and other objects in view, my invention consists in certain novel features of construction and arrangement of parts that will hereinafter be more fully described and claimed and illustrated in the accompanying drawing, in which:

Fig. 1 is a perspective view of a fishing apparatus constructed in accordance with my invention.

Fig. 2 is a vertical section taken on the line 2—2 of Fig. 1.

Fig. 3 is a detail view showing the detachable connection between the edges of two of the walls of the apparatus.

Fig. 4 is a detail section showing the hinge connection between the walls of the apparatus.

Referring by numerals to the accompanying drawing which illustrate a practical embodiment of my invention 10, 10 designate rectangular frames, preferably formed of light weight metal channels and arranged in each frame is a panel 11 of glass.

Arranged in the lower portion of one of these frames are horizontally disposed channel rails 12, thereby providing a rectangular opening that is normally closed by a door and which latter comprises a frame 13 and a panel 14 of glass.

This door is connected by hinges 15 to one of the rails 10 and said door is provided with a suitable latch that is operated by a nob 16. This door permits the fish that are caught within the apparatus to be removed without injury.

The glazed frames thus formed constitute the four walls of the apparatus and at three of the corners between these walls the frames are connected by suitable hinges 17 having vertical axes.

At the fourth corner the edges of the two walls are detachably connected by means of pins 18 that are removably seated in ears 19 that project outwardly from the adjacent frames 10 (see Fig. 3).

Arranged on the upper edges of the frames 10 are perforated ears 20 that receive hooks 21 and the latter being formed on the lower ends of curved arms 22. These arms extend upwardly and inwardly to a central point above the body of the apparatus and their upper ends are suitably connected to a loop or eye 23 and the latter serving as a point of attachment for a cord or cable from which the apparatus is suspended when in the water.

Projecting inwardly from the corners of the apparatus are fingers 24 and loosely arranged beneath said fingers is a substantially square panel 25 of buoyant material, preferably cork wood or analogous material. Projecting inwardly from the corners of the apparatus are short arms 26, preferably of spring wire and suspended from the inner ends of these resilient arms are members 27 that are shaped and colored so as to represent small fish or minnows and therefore serving as lure to attract fish to the apparatus.

Suitably supported in the bottom of the apparatus is a water tight container 28 within which is located a number of storage batteries 29, preferably of the cartridge type and located on top of the container is a reflector 30 within which is located a small electric lamp 31 and the latter being electrically connected to the batteries 29.

In the practical operation of my improved fishing apparatus a cord or cable is connected to eye 23 and the apparatus is lowered from a boat or dock and the rays of light from the lamp 31, which latter receives current from the batteries 29, will be thrown upwardly through the apparatus by the reflector 30, thereby illuminating said apparatus and the lure 27, thereby attracting fish to the apparatus.

The panel 25, being composed of buoyant material, occupies a position directly below the retainers 24 when the apparatus is submerged and in entering the apparatus the fish attracted by the lure pass downwardly through the open upper end of the apparatus and after tilting the buoyant panel 25 downward, as shown by dotted lines in Fig. 2, the fish are trapped within the device below the panel 25, which, after being moved downwardly, returns immediately to its normal position, due to its buoyancy.

When the apparatus is drawn upwardly into the boat or unto the dock, the fish that have entered said apparatus, may be conveniently removed by opening the door comprising the frame 13 and glass panel 14 and thus the fish are caught and removed from the apparatus without the use of hooks, prongs, barbs or the like and without injury to the fish or the loss of blood therefrom.

Thus it will be seen that I have provided a fishing apparatus that is relatively simple in construction, inexpensive of manufacture and very effective in performing the functions for which it is intended.

It will be understood that minor changes in the size, form and construction of the various parts of my improved fishing apparatus may be made and substituted for those herein shown and described without departing from the spirit of my invention, the scope of which is set forth in the appended claims.

I claim as my invention:

1. A fishing apparatus comprising a container having transparent walls and a buoyant panel loosely arranged in the upper portion of said container and serving as a closure for the upper end of said container.

2. A fishing apparatus comprising a container having transparent walls, a buoyant panel loosely arranged in the upper portion of said container and serving as a closure for the upper end of said container and an electric lamp arranged within the lower portion of said container.

3. A fishing apparatus comprising a container having transparent walls, a buoyant panel loosely arranged in the upper portion of said container and serving as a closure for the upper end of said container, an electric lamp arranged within the lower portion of said container and a reflector arranged beneath said electric lamp.

4. In a fishing apparatus, a container having transparent walls, a buoyant panel loosely arranged in the upper portion of said container and serving as an inwardly opening closure for the upper end of said container, an electric lamp in the lower portion of said container and a lure arranged in the container above said lamp.

5. A fishing apparatus comprising a container having transparent walls, a buoyant panel loosely arranged in the upper portion of said container and serving as a closure for the upper end of said container, one of said transparent walls being provided with an opening and a door normally closing said opening.

6. In a fishing apparatus, a container having transparent walls, a water tight housing removably positioned in the lower portion of said container, storage batteries located in said housing, a lamp carried by said housing and connected to the storage batteries therein, a reflector arranged beneath said lamp and a buoyant panel loosely arranged in the upper portion of said container and serving as a downwardly opening closure for the open upper end of said container.

7. In a fishing apparatus, a container having transparent walls, a water tight housing removably positioned in the lower portion of said container, storage batteries located in said housing, a lamp carried by said housing and connected to the storage batteries therein, a reflector arranged beneath said lamp, a buoyant panel loosely arranged in the upper portion of said container and serving as a downwardly opening closure for the open upper end of said container and a lure arranged within the container above said lamp.

8. In a fishing apparatus, a container having transparent walls, a water tight housing removably positioned in the lower portion of said container, storage batteries located in said housing, a lamp carried by said housing and connected to the storage batteries therein, a reflector arranged beneath said lamp, a buoyant panel loosely arranged in the upper portion of said container and serving as a downwardly opening closure for the open upper end of said container, a lure arranged within the container above said lamp and a hanger detachably connected to the upper end of said container.

In testimony whereof I affix my signature.

SAMUEL A. KORNSWEET.